US008508378B2

(12) United States Patent
Ross et al.

(10) Patent No.: US 8,508,378 B2
(45) Date of Patent: Aug. 13, 2013

(54) SYSTEM AND METHOD FOR EXTENDING THE BATTERY LIFE IN INVENTORY CONTROL DEVICES

(75) Inventors: Graham Ross, Poway, CA (US); Mark Raptis, Valley Center, CA (US)

(73) Assignee: CareFusion 303, Inc., San Diego, CA (US)

( * ) Notice: Subject to any disclaimer, the term of this patent is extended or adjusted under 35 U.S.C. 154(b) by 719 days.

(21) Appl. No.: 12/700,632

(22) Filed: Feb. 4, 2010

(65) Prior Publication Data
US 2011/0187544 A1 Aug. 4, 2011

(51) Int. Cl.
G08B 21/00 (2006.01)
H04Q 5/22 (2006.01)
H04N 9/74 (2006.01)

(52) U.S. Cl.
USPC ........ 340/636.2; 340/10.1; 348/578; 370/252

(58) Field of Classification Search
None
See application file for complete search history.

(56) References Cited

U.S. PATENT DOCUMENTS

| 5,838,720 | A * | 11/1998 | Morelli | 375/219 |
|---|---|---|---|---|
| 6,236,674 | B1 * | 5/2001 | Morelli et al. | 375/219 |
| 7,106,266 | B1 * | 9/2006 | Pauley | 343/788 |
| 7,512,423 | B2 * | 3/2009 | Karaoguz | 455/574 |
| 7,602,289 | B2 * | 10/2009 | Ashizawa et al. | 340/572.1 |
| 8,180,409 | B2 * | 5/2012 | Karaoguz | 455/574 |
| 2002/0027448 | A1 | 3/2002 | Bacigalupo | |
| 2005/0261037 | A1 * | 11/2005 | Raghunath et al. | 455/574 |
| 2008/0061148 | A1 * | 3/2008 | Tanner | 235/492 |
| 2008/0088417 | A1 | 4/2008 | Smith et al. | |
| 2008/0094201 | A1 * | 4/2008 | Paradiso et al. | 340/505 |
| 2008/0143487 | A1 | 6/2008 | Hulvey | |
| 2009/0167495 | A1 | 7/2009 | Smith et al. | |
| 2009/0238087 | A1 * | 9/2009 | Shikowitz et al. | 370/252 |
| 2010/0070994 | A1 * | 3/2010 | Yun | 725/33 |
| 2010/0277285 | A1 * | 11/2010 | Anderson et al. | 340/10.4 |

FOREIGN PATENT DOCUMENTS

EP 0444365 A2 9/1991

OTHER PUBLICATIONS

International Search Report and Written Opinion for PCT/US2011/022788 mailed Oct. 31, 2011.

* cited by examiner

*Primary Examiner* — George Bugg
*Assistant Examiner* — Renee Dorsey
(74) *Attorney, Agent, or Firm* — McDermott Will & Emery LLP

(57) ABSTRACT

Systems and methods of extending battery life in inventory control devices are disclosed. A passive receiver configured to wirelessly receive an initiation signal having an associated energy field from a remote control system and to output a mode change signal is provided. The passive receiver is configured to be powered by an energy field associated with the initiation signal. A functional module coupled to the passive receiver and configured to be powered by a self-contained power source when the functional module is in an active mode is provided. The functional module is further configured to receive the mode change signal from the passive receiver and to change from an inactive mode to the active mode. The functional module draws more power from the power source in the active mode than in the inactive mode.

20 Claims, 8 Drawing Sheets

SYSTEM AND METHOD FOR EXTENDING THE BATTERY LIFE IN INVENTORY CONTROL DEVICES

FIELD

The present disclosure relates to inventory control devices, and, in particular, to systems and methods for extending battery life in inventory control devices.

BACKGROUND

Some electronic control devices operate on an "on-demand" basis, meaning that the devices are configured to perform their dedicated function(s) only when requested or called upon by another control system, which will be hereafter referred to as a "remote control system." One example of such an on-demand electronic device is an inventory control device attached to a bin for storing medical supply items in healthcare facilities such as hospitals. Such a device often includes a controller (e.g., a processor) for carrying out various functions relating to inventory of the medical supply items in the bins to which the device is attached, and may further include a transceiver for wirelessly communicating inventory control information, such as the quantity of the supply items, to a remote control system that is configured to communicate with multiple devices/bins.

Because on-demand electronic devices, such as the inventory control device described above, typically are powered by a battery, it is important to minimize the power consumption by the devices as much as possible in order to avoid frequent battery replacement. However, it is often the case that at least a portion of the controller and/or the transceiver (especially the receiver portion) in an on-demand electronic device needs to remain at least partially active in order to "listen for" or detect a wake-up request or other commands wirelessly sent from the remote control system. A familiar example is a "watch-dog" function available in some processors. Under the watch-dog function, a processor is initially placed in an inactive (e.g., sleep) mode involving very little or no power consumption, and when the processor receives a signal input at a pin dedicated for the watch-dog function, the processor wakes up from the inactive mode and changes to an operation mode involving full power consumption. Similar watch-dog functions are available in some available transceivers. However, even in the inactive mode, the power consumption can be nontrivial, especially if the receiver side of the transceiver has to remain active in order to detect a signal from the remote control system. Such nontrivial power consumption will drain batteries more rapidly than desirable.

Hence, there is a need for improvement in a system and method for extending the battery life in on-demand electronic control devices such as wireless inventory control devices.

SUMMARY

Embodiments described herein provide systems and methods for extending the battery life in on-demand electronic control devices.

Certain embodiments provide an inventory control device. The inventory control device can comprise a passive receiver configured to wirelessly receive an initiation signal having an associated energy field from a remote control system and to output a mode change signal. The passive receiver is configured to be powered by an energy field associated with the initiation signal. The inventory control device can further comprise a functional module coupled to the passive receiver and configured to be powered by a self-contained power source when the functional module is in an active mode. The functional module is configured to receive the mode change signal from the passive receiver and to change from an inactive mode to the active mode in response to the mode change signal. The functional module draws more power from the power source in the active mode than in the inactive mode.

Certain embodiments provide a method of conserving battery power in an inventory control device having a passive receiver and a functional module. The method can comprise the passive receiver receiving an initiation signal having an associated energy field from a remote control system. The method can further comprise the passive receiver generating power for the passive receiver from the energy field associated with the initiation signal. The method can further comprise the passive receiver sending a mode change signal to the functional module. The method can further comprise the functional module changing from an inactive mode to an active mode. The functional module uses more power in the active mode than in the inactive mode. The method can further comprise the functional module performing a dedicated function in the active mode.

It is to be understood that both the foregoing summary and the following detailed description are exemplary and explanatory and are intended to provide further explanation of the embodiments as claimed.

BRIEF DESCRIPTION OF THE DRAWINGS

The accompanying drawings, which are included to provide further understanding of the invention and are incorporated in and constitute a part of this specification, illustrate disclosed embodiments and together with the description serve to explain the principles of the disclosed embodiments.

DETAILED DESCRIPTION

Figure 1:
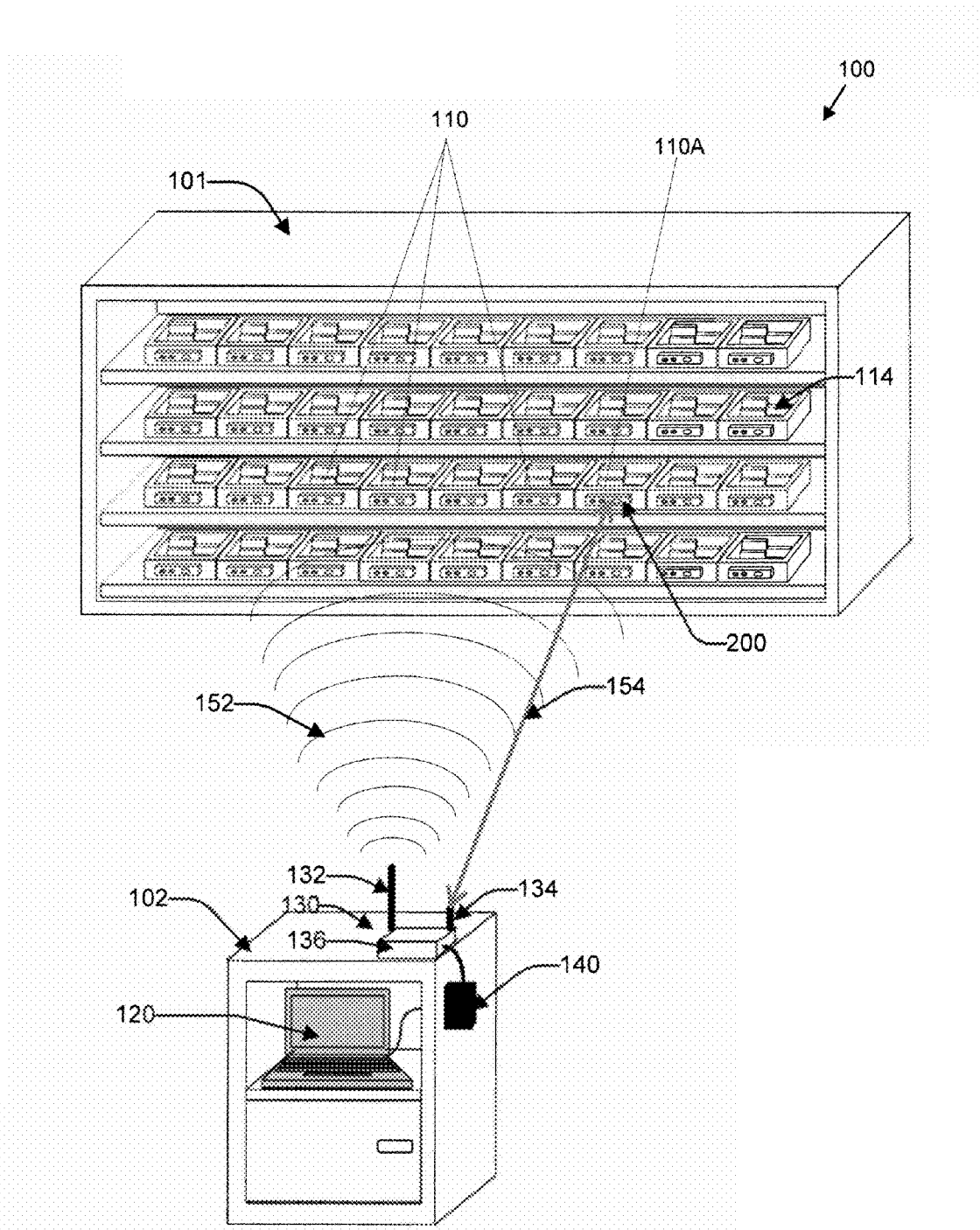
FIG. 1 depicts an exemplary inventory control system comprising a rack containing multiple bins having inventory control devices and a remote control system according to certain embodiments.

In the following detailed description, numerous specific details are set forth to provide a full understanding of the disclosed and claimed embodiments. It will be apparent, however, to one ordinarily skilled in the art that the embodiments may be practiced without some of these specific details. In other instances, well-known structures and techniques have not been shown in detail to avoid unnecessarily obscuring the disclosure.

The word "exemplary" is used herein to mean "serving as an example, instance, or illustration." Any embodiment or design described herein as "exemplary" is not necessarily to be construed as preferred or advantageous over other embodiments or designs.

In medical fields, healthcare facilities require large and varied inventories of medical supplies. One of the challenges in the medical care environment is a care facility's ability to maintain adequate inventory of medical supplies, the demand for which cannot be predicted in advance, so that such supplies will be immediately available for patients needing them. Consumption rates of medical supplies can vary greatly over a period of time, and a reliable inventory control of the supplies is of critical importance.

In many healthcare facilities, numerous racks of bins are used for storing medical supplies, such as medications and disposable parts for medical equipment; and the racks of bins are contained in a central supply room or rooms, or may be spread throughout the healthcare facility. Each bin can contain one or more types of medical supply items, and multiple bins may be used to contain the same type of medical supply item. To manually inspect each bin and count the amount of supply items remaining in each bin on a periodic basis would require substantial amounts of time from the staff.

Instead, an electronic inventory control device can be attached to each bin and used to store data representing the quantity of medical supply items remaining in the bin. In one application, the electronic inventory control device attached to the bin can provide a visual or audio indication to alert a user, such as a nurse or other health provider, of its location so that the user quickly find the bin containing certain supplies of interest. This can be achieved, for example, by a remote control system wirelessly sending an ID signal indicative of a particular bin, and, an inventory control device attached the particular bin providing a visual or audio indication after receiving the ID signal. Alternatively or additionally, the inventory control device can have wireless communication capabilities so as to wirelessly transmit inventory control information, such as the supply item quantity, to the remote inventory control system. The aforementioned inventory control devices operate on an "on-demand" basis because such devices are normally in an inactive mode and change to an active mode when requested or called upon by the remote inventory control system. The following description describes extending battery life in such inventory control devices attached to medical supply bins and configured to communicate with the remote inventory control systems. It shall be appreciated by those skilled in the art, however, that the description of inventory control devices is for illustration purposes only, and the systems and methods disclosed herein can be applied to other on-demand electronic devices without departing from the scope of the present disclosure.

FIG. 1 depicts an exemplary inventory control system 100 comprising a rack 101 containing multiple bins 110, 110A, and a remote control system 102 configured to wirelessly interact with the bins 110, 110A. As illustrated in greater detail in FIG. 2, the bin 110A includes a container 112 for physically storing supply items 114, and an electronic inventory control device 200 for storing, processing, and/or wirelessly communicating inventory control information (e.g., the quantity of the supply items 114). The remote control system 102 includes a computer system 120 running an application program providing inventory control functions such as maintaining a database of different types of medical supply items, their respective currently remaining quantities and order status. The remote control system 112 further includes a remote wireless communication device 130 including a first antenna 132 and a second antenna 134, and a transceiver 136 for processing wireless signals to be transmitted and/or received by the first and second antennas 134, 136. The remote wireless communication device 130 is in data communication with a translator 140. The translator 140 is in data communication with the computer system 120. The translator 140 consolidates multiple copies of a transmitted message from the inventory control device 200 into a single message to a computer system 120. In certain embodiments, each copy is be tagged with an identifier (e.g., a unique number) that is common to all copies of a message. The translator 140 can, for example, pass the first copy of each message to the computer system 120 and then can discard all subsequent copies having the same identifying number. The computer system 120 controls various transmission and reception functions of the remote wireless communication device 130 and receives inventory control or any other information from the inventory control device 200.

In certain embodiments, the inventory control device 200 keeps track of the quantity of the remaining supply items 114. For example, when, one of the items 114 is removed from the bin 110A, a "take" button 210 is pressed on the inventory control device 200 by the user removing the item. The inventory control device 200 then decrements the count of the quantity of the items 114. When one of the items is added to the bin 110A, an "add" button 220 is pressed on the inventory device 200 by the user adding the item. The inventory control device 200 then increments the count of the quantity of items 114. When multiple items 114 are taken or added, the respective button 210, 220 is pressed the number of times corresponding to the number of items 114 either taken or added. In other embodiments, the computer system 120 keeps track of inventory of supply items remaining in a bin (e.g., the bins 110, 110A) based on a message received from the inventory control device 200. For example, the inventory control device 200 associated with a container sends a message to the computer system 200, either directly or via the translator 140, for each press of either button 210 or button 220. The computer system 120 then decrements or increments its record of the inventory of that container.

In the illustrated example, the device 200 also includes visual indicators 230, 240 (e.g., LEDs) for alerting a user after receiving an ID signal indicative of the device 200 from the remote control system 102 or simply providing a status of the device such as a low battery condition. In alternative embodiments, audio indicators such as a buzzer are employed to provide the alert function(s). In some embodiments, the device 200 also includes a display, such as an LCD display or a collection of alphanumeric LED displays, to indicate the quantity of supplies 114 and/or the device status.

As indicated above, in certain embodiments, the inventory control device 200 has wireless communication capabilities such that the remote control system 102 can wirelessly query the device 200 for certain inventory control information (e.g., the quantity of the remaining supply items 114), and the device 200 can wirelessly send the queried information to the remote control system 102.

Figure 2:
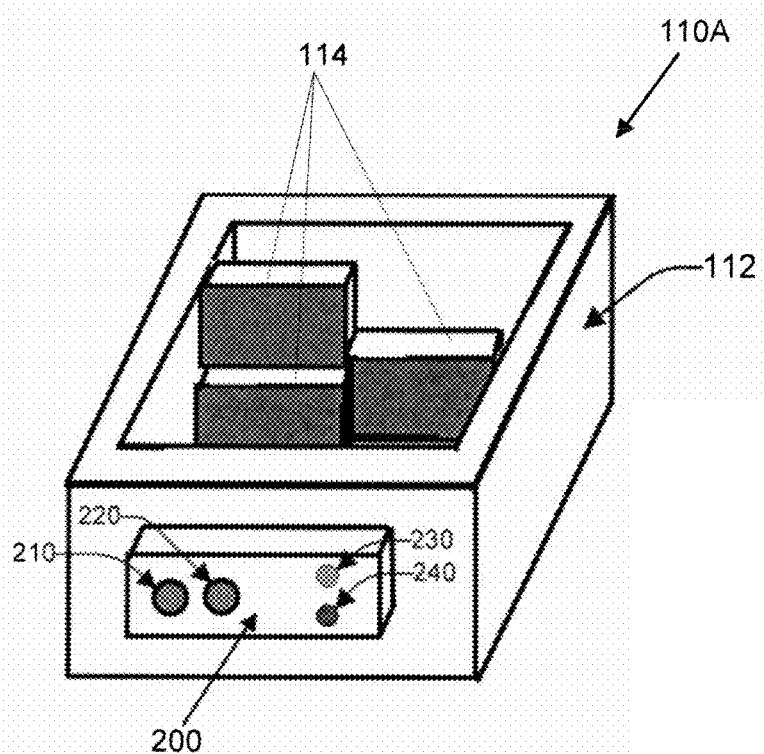
FIG. 2 is a diagram of an exemplary bin including a container for physically storing supply items and an inventory control device attached to the container for performing one or more dedicated inventory control functions according to certain embodiments.
Figure 3A:
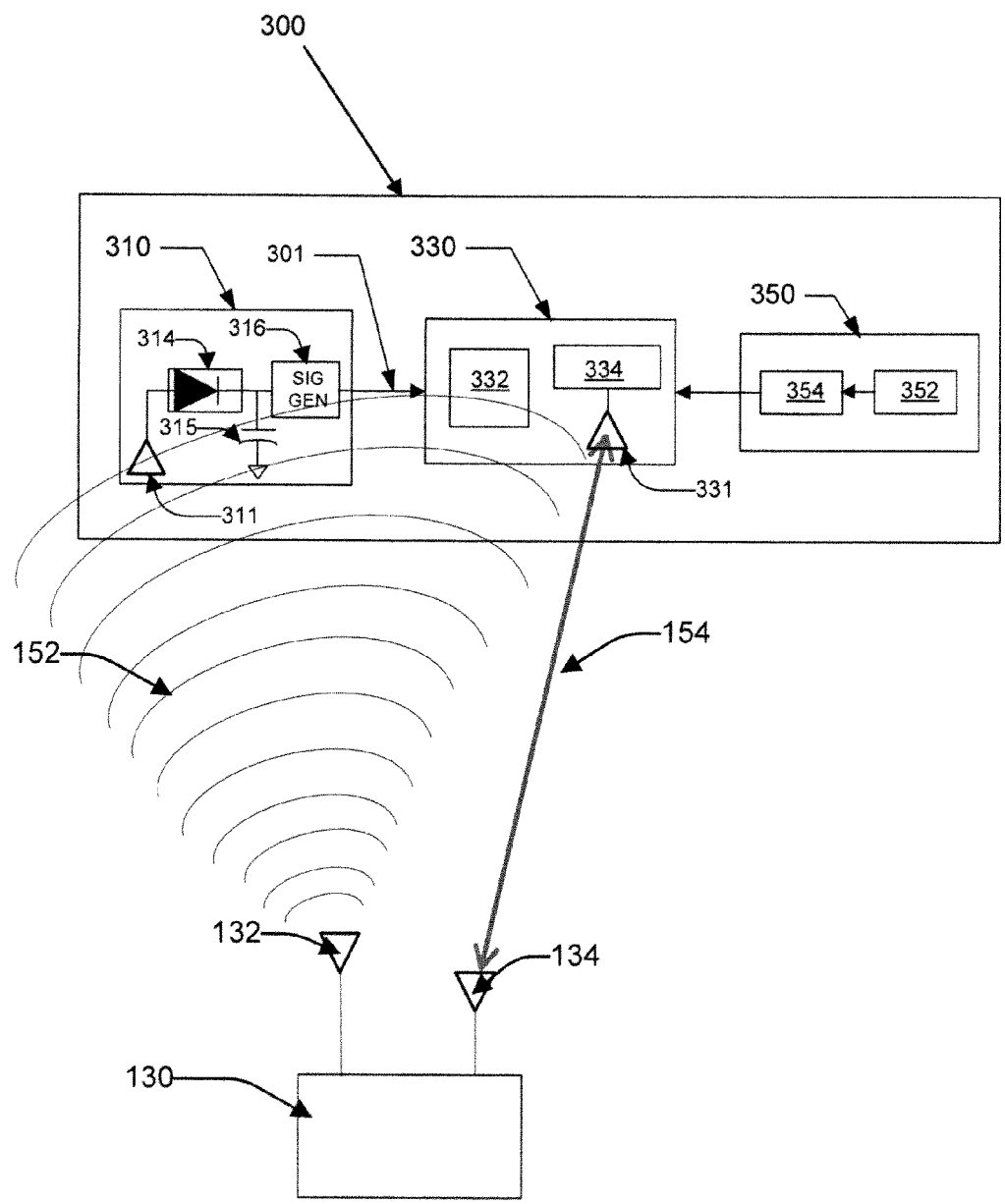
FIG. 3A is an exemplary block circuit diagram for the inventory control device according to certain embodiments.

FIG. 3A is an exemplary block circuit diagram 300 for the inventory control device 200 of FIG. 2 according to certain embodiments. The circuit diagram 300 shows a passive receiver 310, a functional module 330 connected to the passive receiver 310, and a self-contained power source 350 connected to the functional module 330. As used herein the term "self-contained power source" refers to a power source included in or otherwise associated with the inventory control device 200 and configured to provide electrical power (e.g., DC voltage and current) to the functional module 330 of the device 200 without receiving power from an AC power source (e.g., a wall-outlet) and includes at least an energy storage device such as a rechargeable or disposable battery and optionally may include a voltage regulator for providing regulated DC power to the functional module 330. In the illustrated example, the self-contained power source (which will be hereinafter referred to as the "power source") includes a battery 352 and a voltage regulator 354.

The passive receiver 310 include a receiver antenna 311 configured to receive an initiation signal 152 from the remote control system 102 (FIG. 1). The passive receiver 310 further includes a rectifying circuit 314 connected to the receiver antenna 311 and configured to rectify at least a portion of the received initiation signal 152 to produce a DC current. The rectifying circuit 314 can include one or more fast diodes arranged in a full or half-wave bridge configuration. The passive receiver 310 further includes a capacitor 315 connected to the rectifying circuit 314 and configured to be charged from the DC current produced by the rectifying circuit 314. The capacitor 315 can be any capacitor capable of storing DC energy including, but not limited to, tantalum and electrolytic capacitors, having a capacitance.

The receiver antenna 311 receives the magnetic or electric field of the initiation signal 152. When the output voltage of the receiver antenna 311 induced by the field is above the conduction threshold of a diode inside the rectifying circuit 314, a charging current flows through the diode and stores a charge in the capacitor 315 at a rate of charge.

Figure 3B:
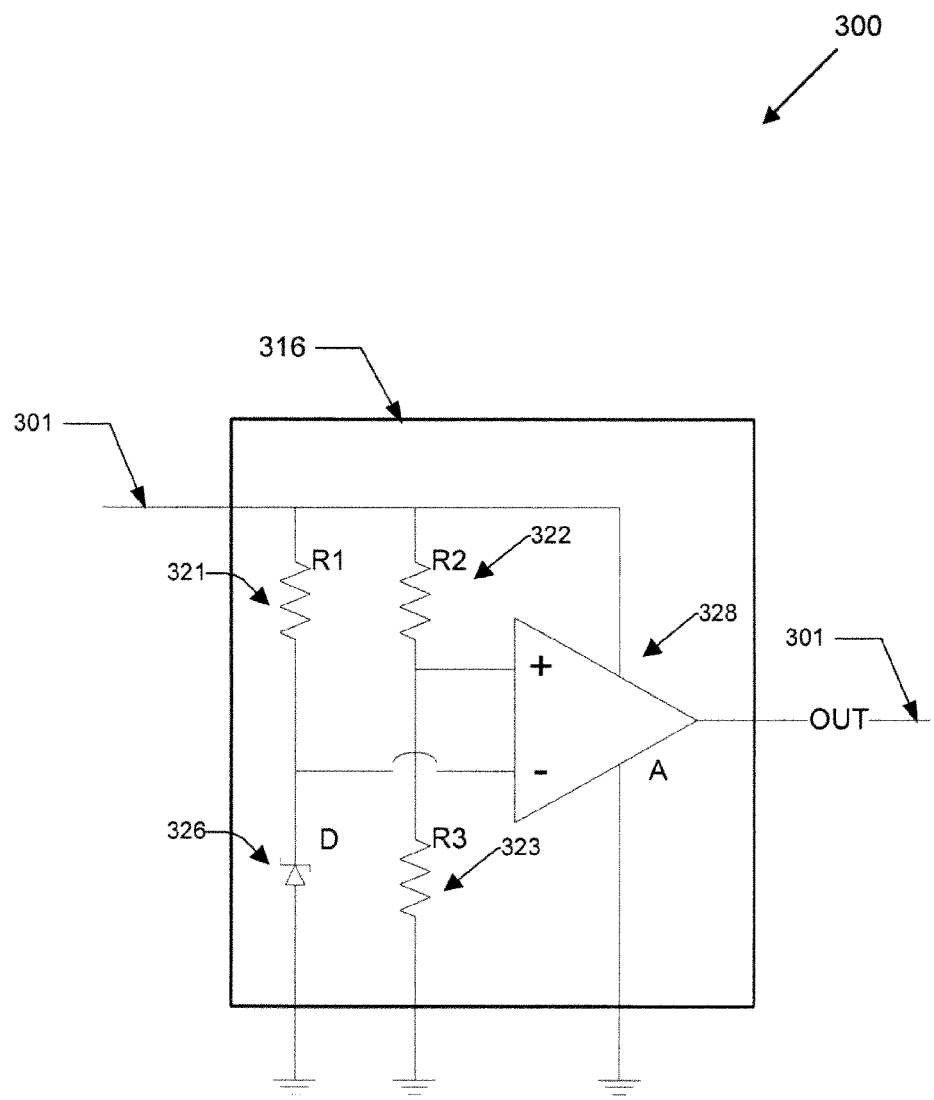
FIG. 3B is an exemplary circuit diagram for a signal generator included in a passive receiver portion of the inventory control device according to certain embodiments.

In the illustrated example, the passive receiver 310 further includes a signal generator 316 connected to the capacitor 315 to be powered thereby and configured to generate a mode change signal 301 when the capacitor 315 is sufficiently charged (e.g., above a threshold voltage). FIG. 3B is an exemplary circuit diagram for the signal generator 316 configured to generate the mode signal 301 according to certain embodiments. In the illustrated example, the signal generator 316 includes a first resistor (R1) 321, a second resistor (R2) 322, a third resistor (R3) 323, a diode (D) 326, and an op amp 328. In certain embodiments, R2 322 and R3 323 are substantially of the same value (e.g., about 10 megaohms). R1 321 may be of the same or higher value than the value for R2 322 and R3 323. The charge stored in the capacitor 315 is discharged through R2-R3 322-323 with time, but the rate of charge is much higher than the discharge rate for the capacitor 315 while the field associated with the initiation signal 152 is applied. When the voltage on the capacitor 315 is sufficiently high, the voltage powers up the op amp 328

In the illustrated example, D 326 is a Zener diode with a breakdown voltage of about 1 volt, for example. The voltage between R2 322 and R3 323 is substantially about half that of the voltage on the capacitor 315 and is the input on the positive terminal of the op amp 328. The voltage between R1 321 and D 326, which is the negative input of the op amp 328, rises up to the breakdown voltage of D 326 and then remains at that level. Consequently, as the voltage on the capacitor 315 rises from zero to 1 volt, for example, the positive input rises to 0.5 volt while the negative input rises to 1 volt, and the op amp output is zero. When the voltage on the capacitor 315 exceeds 2 volts, for example, the negative input is still 1 volt and the positive input exceeds 1 volt, causing the output of the op amp 328 to change to the designated output voltage (a control circuit to set this voltage is omitted from this figure).

Return now to FIG. 3A, the functional module 330 is configured to perform one or more dedicated functions, such as keeping track of the inventory of the remaining supply items 114 (FIG. 2) and communicating data signals 154 from and to the remote inventory control system 102 (FIG. 1). In the illustrated example, the functional module 330 includes a controller 332 (e.g., a processor and/or logic circuit), a transceiver antenna 331 that is capable of receiving and transmitting data signals 154 from and to the remote control system 102 via the second antenna 134, and a transceiver 334 associated with the transceiver antenna 331 and configured to perform signal processing functions associated with data signals 154 such as RF generation, modulation, and/or demodulation. The transceiver antenna 331 may be a single antenna, such as a dipole antenna, that is capable of both receiving and transmitting data signals 154, or may include separate receiver and transmitter antennas, or even an array of antennas. Various connections arrangements are possible among the controller 332, the transceiver 334, and the power source 350, two examples of which will be illustrated in and described below with respect to FIGS. 5 and 6. While the functional module 320 is powered by the power source 350 at least in the active mode, the passive receiver module 310 is not powered by, and therefore draws no power from, the power source 350.

Figure 4:
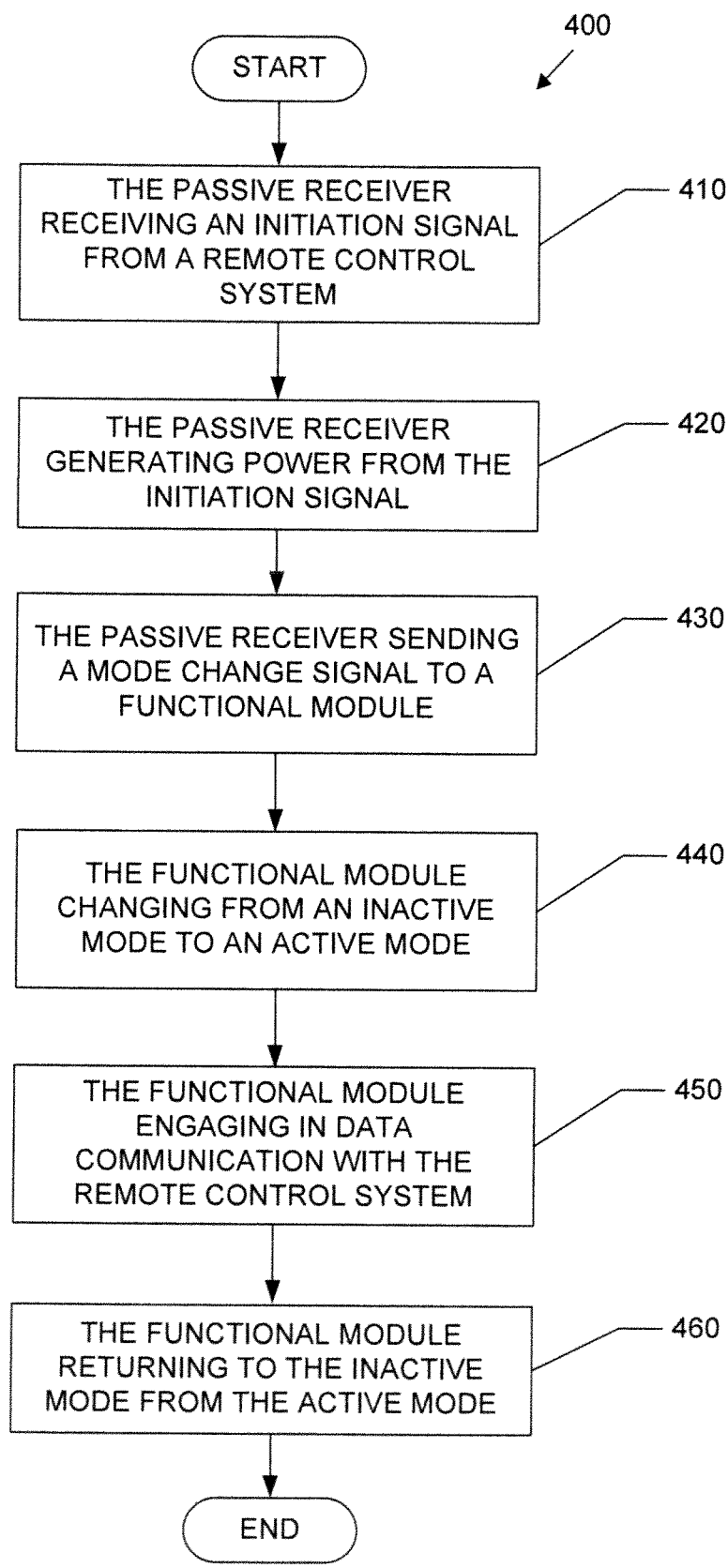
FIG. 4 is a flowchart illustrating a process for an exemplary operation of the inventory control device according to certain embodiments.

FIG. 4 is a flowchart illustrating a process 400 for an exemplary operation of the inventory control device 200 (FIG. 2) according to certain embodiments. For the purpose of illustration with clarity with no intent of limitation, the process 400 will be described with specific references to FIGS. 1 and 3. Also for the purpose of illustration, assume that the remote control system 102 (FIG. 1) desires to engage in data communication with the inventory control device 200 associated with the bin 110A to acquire certain information, such as the quantity of supply items or a low battery condition, from the device 200. Initially, the functional module 330 is placed in an inactive mode in which the functional module 330 draws very little or no power from the power source 350. This can be achieved for example by either completely turning off the transceiver 334 (both the receiver and transmitter portions) or placing the transceiver in a low-power mode, e.g., by turning off the transmitter portion but leaving the receiver portion in a low-power or other partially active mode. Accordingly, the transceiver 334 in the inactive mode draws far less power from the power source 350 than in conventional configurations in which at least a receiver portion of the transceiver is in an active mode in order to detect a query signal. Similarly, the controller 332 is either completely turned off or placed in a low-power mode.

The process 400 begins at a state 410, in which the passive receiver 310 receives the initiation signal 152 having an energy field from the wireless communication device 130 via the receiver antenna 311. The initiation signal 152 is preferably a signal having a low carrier frequency (e.g., 13.56 MHz) having a relatively long wavelength and a wide beam width to cover the bins 110, 110A (FIG. 1) with substantially the same energy field strength. The process 400 proceeds to a state 420, in which the passive receive 310 generates DC power from the energy field associated with the received initiation signal 154. This can be achieved, for example, by the rectifying circuit 314 rectifying the initiation signal 152 to produce a DC current and the capacitor 315 being sufficiently charged by the DC current. The sufficient charging of the capacitor 315 can involve the passive receiver 310 receiving one or more initiation signals of variable lengths depending on the strength of the energy field, the conversion efficiency of the rectification circuit 314, and/or the capacitance of the capacitor 315. The process 400 proceeds to a state 430, in which the passive receiver 310 outputs the mode change signal 310 to the functional module 330 once the capacitor 315 is sufficiently charged from the DC current, e.g., above a threshold voltage. The mode change signal 301 can remain on (e.g., logical high) while the voltage at the capacitor 315 remains above the threshold voltage, for example. Alternatively, the mode change signal 301 can be a single short pulse lasting, for example, several microseconds only.

The process 400 proceeds to a state 440, in which the functional module 330 changes from the initial inactive mode to an active mode in response to the mode change signal 301 received from the passive receiver 310. As used herein, the term "active mode" as applied to the function module 330 is defined or characterized relative to the "inactive mode" in that the functional module 330 draws or uses more power from the power source 350 in the active mode than in the inactive mode. For example, the controller 332 changes from an off-state or a low-power mode to an operation mode in response to the mode change signal, The transceiver 334 can also change from an off-state or a low-power mode to an operation mode. Details regarding the functional module 330 effectuating the change from the inactive mode to the active mode will be described in detail below with respect to FIGS. 4 and 5.

The process 400 proceeds to a state 450, in which the functional module 330, now in the active mode, engages in data communication with the remote control system 102 whence the initiation signal 152 came by receiving and/or transmitting the data signal 154. The data signal 154 can be any RF or microwave signal. In certain embodiments, the data signal 154 emitted by the second antenna 134 of the remote wireless communication device 130 associated with the remote control system 102 is substantially omni-directional to cover all bins 110, 110A. In other embodiments, the data signal 154 emitted by the second antenna 134 (e.g., a phase-array antenna) is directional, meaning that it is directed to a particular bin (e.g., the bin 110A) at a known relative location.

As an instance of the data communication between the functional module 330 and the remote control system 102, the functional module 330 receives an ID signal from the remote control system 102, where the ID signal comprises ID data indicative of at least one inventory control device among a plurality of inventory control devices 110, 110A. The controller 332 receives and extracts (e.g., decodes) the ID data and compares it to a stored data indicative of a unique ID of the inventory control device 200 or the bin 110A to which the device 200 is attached. If the controller 332 determines that the ID data and the stored data match, indicating that the remote control system 102 wishes to engage in data communication with the particular device 200, the functional module 330 performs or waits for a further data communication with the remote control system 102 or performs other dedicated functions such as providing a visual or audio indication for alerting a user of its location, for example.

As another instance of the data communication, the functional module 330 listens for a query signal from the remote control system 102 requesting certain information from the remote control system 102. Once the query signal is received by the functional module 330, the controller 332 deciphers what information is being queried or requested, prepares data representative of the requested information, and outputs the data to the transceiver 334 where a data signal comprising the data is generated. The data signal is transmitted to the remote control system 102 via the transceiver antenna 331.

The process 400 proceeds to a state 460, in which the functional module 330 returns to the inactive mode from the active mode if one or more preset conditions are satisfied. For example, in certain embodiments, the functional module 330 returns to the inactive mode if the functional module 330 does not receive an ID signal indicative of the wireless communication device 200 from the remote control system 102 within a preset time duration after receiving the mode change signal. The functional module 330 can also return to the inactive mode if the functional module 330 does not receive a data signal 154 (e.g., a query signal) from the remote control system 102 within a preset time duration after receiving the ID signal indicative of the wireless communication device 200. The functional module 330 can also return to the inactive mode if the functional module 330 does not receive a new data signal from the remote control system 102 within a preset time duration after a last data communication such as a reception of a query or a transmission of a queried information from and to the remote control system 102.

It shall be appreciated that various embodiments illustrated and described with respect to FIGS. 1-4 are for illustration purposes only, and various modifications to the illustrated embodiments or entirely different embodiments may be employed without departing from the scope of the present disclosure. For example, in certain embodiments, the inventory control device 200 is not physically attached to the container 112. Instead, the device 200 may be attached or otherwise coupled to the rack 101 nearby the container 112. Alternatively, the device 200 can be mounted on the exterior of a cabinet or refrigerator that contains multiple containers. In such alternative embodiments, the association of the inventory control device 200 with the container 112 can be achieved by common labeling of the device and the container. The device 200, instead of being attached to the front of the container 112, may be attached to the side or the back or the bottom or the inside of the container 112. Different bins 110 may have different sizes of containers. The remote wireless communication device 130 may have only one antenna instead of two antennas 132, 134 as shown in FIG. 1. The one antenna of the remote wireless communication device 130 may be capable of transmitting both the initiation signal 152 and the data signals 154. The initiation signal 152 and data signals 154 may have the same carrier frequency. Likewise, the inventory control device 200 may include only one antenna instead of the two antennas 311, 331 as shown in FIG. 3A. The one antenna of the inventory control device 200 may receive the initiation signal and transmit and receive data signals 154. The antenna(s) associated with the inventory control device 200 may be positioned outside the device 200. While the power source 350 is shown separate from the functional module 330 in the illustrated examples of FIGS. 3, 5, and 6, the power source 350 may be included with the functional module 330. The passive receiver 310, 310A,B may not have the separate dedicated signal generator 316 for generating the mode change signal 301. Instead, the voltage at the capacitor 315 exceeding a threshold voltage (e.g., 3 volts) may act as the mode change signal for triggering the described mode change(s) in the functional module 330, 330A,B. In certain embodiments, all or some of the functions of the passive receiver 310 and the functional module 330 may be implemented in a single integrated circuit (IC) comprising a processor and other logic or analog circuit components.

Figure 5:
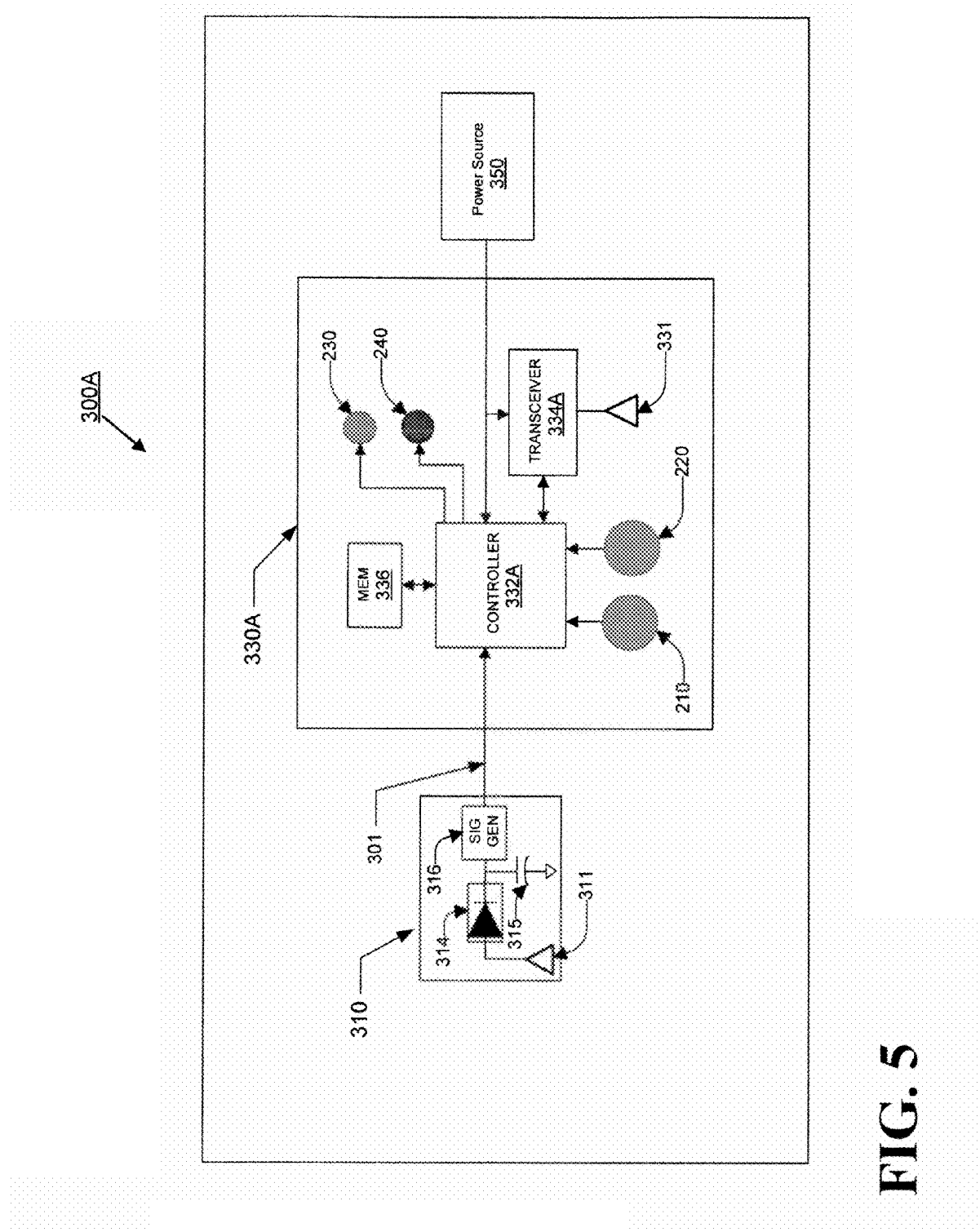
FIG. 5 is a block circuit diagram illustrating an exemplary functional module of the inventory control device according to certain embodiments.

FIG. 5 is a block circuit diagram 300A illustrating an exemplary functional module 330A according to certain embodiments. The circuit diagram 300A shows the passive receiver 310, a functional module 330A connected to the passive receiver 310, and the power source 350 connected to the functional module 330A. In the illustrated example, the passive receiver 310 has the same configuration as the passive receiver 310 shown in FIG. 3A, and the description of the passive receiver 310 provided above with respect to FIG. 3A is not repeated here. The following description will instead focus on how various components of the functional module 330A are arranged and how the components (particularly the controller 332 and the transceiver 334) are connected to and draw power from the power source 350.

The functional module 330A includes a controller 332A having an input connected to the output of the passive receiver 310 and configured to receive the mode change signal 301, a transceiver 334 in data communication with the controller 332, and a transceiver antenna 331 connected to the transceiver 334 to receive and transmit data signals from and to the remote control system 102 (FIG. 1). The exemplary functional module 330B further includes memory 336 for storing information such as ID data for the device 200 and the number of supply items remaining in the container 112 (FIG. 2). The memory 336 may be powered by the power source 350 or a separate battery (not shown). The functional module 330A further includes the "take" button 210 and the "add" button 220 both connected to inputs of the controller 332A and configured to be pressed by the user when removing and adding the supply item(s) from and to the container 112, respectively, as described above with respect to FIG. 2. The exemplary functional module 330B further includes indicators 230, 240 (e.g., LEDs or a buzzer) connected to outputs of the controller 332A and configured to provide an alert to a user, in the manner also described above with respect to FIG. 2. More significantly, both the controller 332A and the transceiver 334A are directly connected to and configured to be powered from the power source 350.

The functional module 330A is initially placed in an inactive mode. In certain embodiments, in the inactive mode, one or both of the controller 332A and the transceiver 334A are placed in a low-power mode in which a minimal (but not zero) amount of power is drawn from the power source 350. In other embodiments, the one or both of the controller 332A and the transceiver 334A are placed in an off-state in which no power is drawn from the power source 350. Then, the remote control system 102, or more particularly, the first antenna 132 of the remote wireless control device 130 (FIG. 1) transmits an initiation signal 152 towards the bins 110, 110A. The passive receiver 310 of the inventory control device 200 associated with the bin 110A receives the initiation signal 152 via the receiver antenna 311 and generates the mode change signal 301 in the manner described above with respect to FIG. 3A. The controller 332A receives the mode change signal 301 from the passive receiver 310 and changes from the low-power mode to an operation mode in which the controller 332A begins to draw a greater amount of power from the power source 350 in response to the mode change signal 301. Further in response to the mode change signal 301, the controller 332A provides an output indicative of the reception of the mode change signal 301 to the transceiver 334A, and the transceiver 334A changes from a low-power mode to an operation mode in response to the output. At this stage, the inventory control device 200 has changed from an inactive mode to an active mode in which the controller 332A and/or the transceiver 334A are ready to engage in data communication with the remote control system 102 or to perform other dedicated function(s). An exemplary data communication operation of a remote control system is provided above with respect to the functional module 330 of FIG. 3A and is not repeated here.

Figure 6:
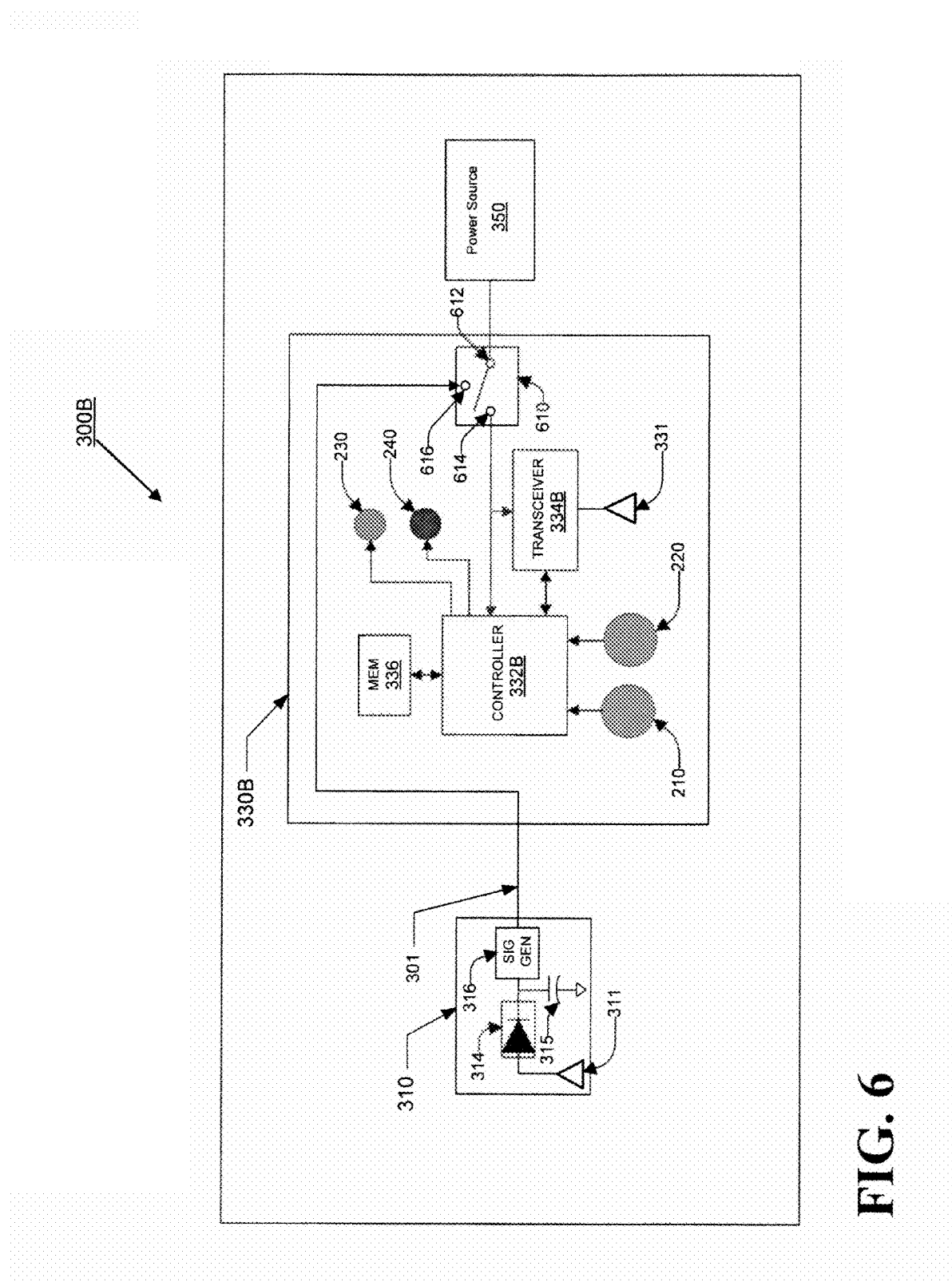
FIG. 6 is a block circuit diagram illustrating an alternative exemplary functional module of the inventory control device according to certain embodiments.

FIG. 6 is a block circuit diagram 300B illustrating another exemplary functional module 330B according to certain embodiments. The circuit diagram 300B shows the passive receiver 310, a functional module 330B connected to the passive receiver 310, and the power source 350 connected to the functional module 330B. In the illustrated example, the passive receiver 310 has the same configuration as the passive receiver 310 shown in FIGS. 3 and 4. Hence, the description of the passive receiver 310 is not repeated here. Furthermore, the functional module 330B and the functional module 330A (FIG. 5) share some components such as the take and add button 210, 220, the memory 336, and the indicators 230, 240, and their descriptions will not be repeated. Instead, the following description will instead focus on how a controller 332B, a transceiver 3348, and a switch 610 of the functional module 330B are connected, electrically and operationally, to the passive receiver 310 and the power source 350.

The functional module 330B includes the controller 332B and the transceiver 334B in data communication with the controller 332B, and a transceiver antenna 331 connected to the transceiver 334B to receive and transmit data signals from and to the remote control system 102 (FIG. 1). The functional module 330B further includes the switch 610 having a power input 612, a power output 614, and a control input 616. Examples of the switch 610 include, but are not limited to, a semiconductor switch as a FET or bipolar transistor switch, and an electromechanical relay, and a magnetic switch such as a reed relay. The power input 612 of the switch 610 is connected to the power source 350, and the power output 614 of the switch 610 is connected to power (e.g., voltage) inputs of the controller 332B and the transceiver 334B. The control input 616 of the switch is connected to the output of the passive receiver 310 and configured to receive the mode change signal 301.

The switch 616 is initially in a normally-open position such that in absence of the mode change signal 301, the controller 332B and the transceiver 334B are disconnected from the power source 350. Then, the remote control system 102, or more particularly, the first antenna 132 of the remote wireless control device 130 (FIGS. 1 and 2) transmits the initiation signal 152 towards the bins 110, 110A. The passive receiver 310 of the inventory control device 200 associated with the bin 110A receives the initiation signal 152 via the receiver antenna 311 and generates the mode change signal 301 in the manner described above with respect to FIG. 3A. The switch 610 receives the mode change signal 301 from the passive receiver 310 and switches from the normally-open position to a closed position such that the controller 332B and the transceiver 334B are now connected to the power source 350. Once receiving the power, the controller 332B and the receiver 334B are configured to change from the no-power states to operation modes, thereby causing the functional module 330B to change from the inactive mode to an active mode in which the controller 332B and/or the transceiver 334B are ready to engage in data communication with the remote control system 102 or to perform other dedicated function(s). An exemplary data communication operation of a remote control system is provided above with respect to the functional module 330 of FIG. 3A and is not repeated here.

It shall be appreciated by those skilled in the art in view of the present disclosure that various modifications may be made to the illustrated embodiments of FIGS. 5 and 6 without departing from the scope of the present disclosure. For example, the functional module 330A of FIG. 5 may be modified such that the mode change signal 301 from the passive receiver 310 is connected to inputs (e.g., wake-up inputs) of both the controller 332A and the transceiver 334A. With the modification, both the controller 332A and the transceiver 334A both receive the mode change signal 301 at the same time and can change from their respective low-power modes to the operations modes at the same time. Some features of the embodiments of FIGS. 5 and 6 may be mixed. For example, in one alternative embodiment, one of the controller and the transceiver is powered directly by the power source 350 while the other of the controller and the transceiver is powered through the switch 610. The memory 336 may be part of the controller 332. The controller 332 may be part of the transceiver 334. The power source 350 may be part of the functional module 330A, B. Some embodiments may not have the separate controller 332A,B.

Figure 7:
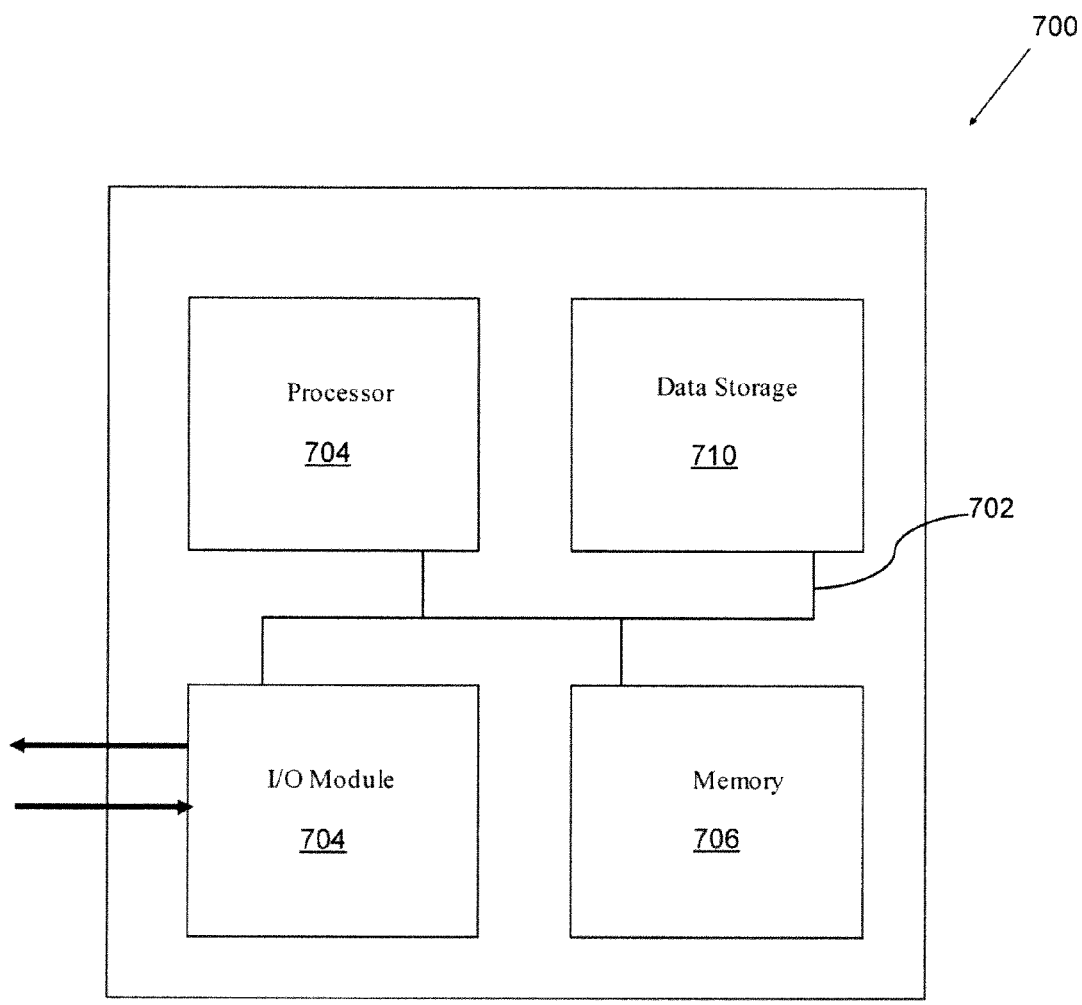
FIG. 7 is a block diagram that illustrates an exemplary computer system upon which certain features of the systems and methods described herein may be implemented.

According to certain embodiments, certain aspects of the systems and methods described herein are performed by a computer system 700 in response to processor 704 executing one or more sequences of one or more instructions contained in memory 706. For example, the computer system 120 running an application program providing inventory control functions such as maintaining a data base of different types of medical supplies, their respective currently remaining quantities, and their order status, such as the one described above with respect to FIG. 1 may be implemented with the computer system 700 shown in FIG. 7 with processor 704 executing instructions for the application program. In addition, some of the functions of the functional module 330, 330A, 330B of FIGS. 3, 5, and 6 may be implemented with the computer system 700, with processor 704 performing the described functions of the controller 332, and memory 706 performing the described functions of the memory 336. Processor 704 may be a microprocessor, a microcontroller, and a digital signal processor (DSP) capable of executing computer instructions. Such instructions may be read into memory 706 from another machine-readable medium, such as data storage device 710. Execution of the sequences of instructions contained in main memory 706 causes processor 704 to perform the process steps described herein. One or more processors in a multi-processing arrangement may also be employed to execute the sequences of instructions contained in memory 706. In alternative embodiments, hard-wired circuitry may be used in place of or in combination with software instructions to implement various embodiments. Thus, embodiments are not limited to any specific combination of hardware circuitry and software.

The term "machine-readable medium" as used herein refers to any medium that participates in providing instructions to processor 704 for execution or storing results of or parameters (e.g., variables or constants) for computations such as for the determination of the fluid pressure within the cassette based on a sensed measurement variable. Such a medium may take many forms, including, but not limited to, non-volatile media, volatile media, and transmission media. Non-volatile media include, for example, optical or magnetic disks, such as data storage device 710. Volatile media include dynamic memory, such as memory 706. Transmission media include coaxial cables, copper wire, and fiber optics, including the wires that comprise bus 702. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The foregoing description is provided to enable any person skilled in the art to practice the various embodiments described herein. While the foregoing embodiments have been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later conic to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An inventory control device comprising:
 a passive receiver comprising:
  a first antenna configured to wirelessly receive an initiation signal having an associated energy field from a remote control system;
  a capacitor;
  a rectifier circuit coupled between the antenna and the capacitor, the rectifier circuit configured to convert the initiation signal into a direct current for charging the capacitor; and
  a signal generator coupled to the capacitor and configured to be powered solely by the capacitor and to output a mode change signal when the capacitor is charged above a threshold voltage; and
 a functional module comprising:
  a second antenna configured to wirelessly receive a data signal from the remote control system, the data signal comprising identification (ID) data;
  an indicator comprising at least one of an audio indicator and a visual indicator;
  a self-contained power source; and
  a controller coupled to the second antenna, the indicator, the power source, and the signal generator, the controller comprising a stored ID indicative of the inventory control device, an inactive mode wherein the controller is not responsive to signals received by the second antenna, and an active mode wherein the controller activates the indicator upon receipt through the second antenna of a data signal that comprises ID data that matches the stored ID, wherein the controller is configured to change from the inactive mode to the active mode in response to receipt of the mode change signal from the signal generator, the functional module drawing more power from the power source in the active mode than in the inactive mode.

2. The device of claim 1, wherein the power source of the functional module comprises a battery.

3. The device of claim 1, the functional module further comprising a transceiver coupled to the power source and the signal generator and comprising a low-power mode and an operation mode, the transceiver being configured to change from the low-power mode to the operation mode in response to receipt of the mode change signal, the transceiver drawing more power from the power source in the operation mode than in the low-power mode.

4. The device of claim 1, the further comprising a switch coupled to the signal generator, the controller, and the power source, the switch configured to receive the mode change signal from the signal generator and to connect the controller to the power source in response to receipt of the mode change signal.

5. The device of claim 4, the functional module further comprising a transceiver coupled to the switch, wherein the switch is further configured to connect the transceiver to the power source in response to receipt of the mode change signal.

6. The device of claim 1, wherein the controller is further configured to at least one of send a data signal to and receive a data signal from the remote control system when the controller is in the active mode.

7. The device of claim 1, wherein the controller is further configured to return to the inactive mode if an ID signal indicative of the inventory control device is not received within a first preset time duration after receiving the initiation signal.

8. The device of claim 7, wherein the controller is further configured to return to the inactive mode if a data signal is not received from the remote control system within a second preset time duration after receiving the ID.

9. The device of claim 8, wherein the controller is further configured to return to the inactive mode if a new data signal is not received from the remote control system within a third preset time duration after receiving a last prior data signal.

10. The device of claim 1, wherein the indicator comprises at least one visual indicator.

11. The device of claim 1, wherein the inventory control device is coupled to a container configured to store an inventory of supply items.

12. The device of claim 11, wherein the functional module is further configured to transmit data representative of the inventory stored in the container.

13. The device of claim 11, wherein the functional module further comprises at least one button coupled to the controller for indicating when one or more supplies are taken from or added to the container.

14. The device of claim 13, wherein the function module is configured to transmit data indicative of the one or more supplies taken from or added to the container to an external computer system that performs an inventory tracking.

15. A method of conserving battery power in an inventory control device, the method comprising the steps of:
receiving with a first antenna an initiation signal having an associated energy field from a remote control system;
rectifying the received initiation signal to form a direct current (DC) voltage;
charging a capacitor with the DC voltage;
sending, upon the capacitor being charged to a threshold voltage, a mode change signal with a device powered solely by the capacitor to a controller that is powered by a self-contained power source and that has an active mode and an inactive mode, wherein the controller uses more power in the active mode than in the inactive mod; and
wherein receipt of the mode change signal by the controller causes the controller to enter the active mode and activate an indicator comprising at least one of an audio indicator and a visual indicator.

16. The method of claim 15, wherein:
the controller comprises a switch having a power input connected to the power source and a power output connected to at least one of the controller and a transceiver; and
receipt of the mode change signal by the controller comprises receipt of the mode change signal by the switch thereby causing the switch to connect the power source to the at least one of the controller and the transceiver.

17. The method of claim 15, further comprising the step of returning the functional module to the inactive mode if one or more preset conditions are satisfied.

18. The method of claim 17, wherein the one or more preset conditions comprise not receiving with a second antenna an identification (ID) signal indicative of the inventory control device from the remote control system within a first preset time duration after receiving the initiation signal.

19. The method of claim 18, wherein the one or more preset conditions further comprise not receiving a data signal from the remote control system within a second preset time duration after receiving the ID signal.

20. The method of claim 19, wherein the one or more preset conditions further comprise not receiving a new data signal from the remote control system within a third preset time duration after a last prior data signal.

* * * * *